United States Patent
Wang et al.

(10) Patent No.: US 11,456,906 B2
(45) Date of Patent: Sep. 27, 2022

(54) REFERENCE SIGNAL CONFIGURATIONS FOR DOPPLER SUPPORT IN NEW RADIO DESIGN

(71) Applicant: QUALCOMM Incorporated, San Diego, CA (US)

(72) Inventors: Renqiu Wang, San Diego, CA (US); Hao Xu, Beijing (CN); Wanshi Chen, San Diego, CA (US); Peter Gaal, San Diego, CA (US); Tingfang Ji, San Diego, CA (US); John Edward Smee, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/991,609

(22) Filed: Aug. 12, 2020

(65) Prior Publication Data

US 2021/0028966 A1   Jan. 28, 2021

Related U.S. Application Data

(63) Continuation of application No. 15/671,184, filed on Aug. 8, 2017, now Pat. No. 10,771,299.

(Continued)

(51) Int. Cl.
*H04L 27/26* (2006.01)
*H04L 5/00* (2006.01)
(Continued)

(52) U.S. Cl.
CPC ........ *H04L 27/2613* (2013.01); *G01S 13/505* (2013.01); *H04L 5/0048* (2013.01); *H04L 5/0051* (2013.01); *H04L 5/0058* (2013.01); *H04L 5/0094* (2013.01); *H04L 27/262* (2013.01); *H04L 23/02* (2013.01); *H04L 25/0226* (2013.01)

(58) Field of Classification Search
CPC . H04L 27/2613; H04L 5/0048; H04L 5/0051; H04L 27/262; H04L 5/0094; H04L 5/0058; H04L 25/0226; H04L 23/02; G01S 13/505
USPC .............. 455/450–452.2; 370/252, 281, 295, 370/319–320, 329–330
See application file for complete search history.

(56) References Cited

U.S. PATENT DOCUMENTS 8,553,594 B2   10/2013 Baum et al.
9,337,974 B2   5/2016 Miao et al.
(Continued)

FOREIGN PATENT DOCUMENTS

WO   2011057257 A1   5/2011

OTHER PUBLICATIONS

International Preliminary Report on Patentability—PCT/US2017/046015, The International Bureau of WIPO—Geneva, Switzerland, dated Feb. 21, 2019.
(Continued)

*Primary Examiner* — Michael Y Mapa
(74) *Attorney, Agent, or Firm* — Patterson+ Sheridan, L.L.P.

(57) ABSTRACT

Certain aspects of the present disclosure provide techniques for transmitting and processing reference signals, such as DMRS, that may account for mobility characteristics (e.g., that relate to a Doppler measurement) of a wireless node (e.g., a UE), such as Doppler measurements indicating how fast such a device is moving.

26 Claims, 21 Drawing Sheets

Related U.S. Application Data

(60) Provisional application No. 62/373,259, filed on Aug. 10, 2016.

(51) Int. Cl.
*G01S 13/50* (2006.01)
*H04L 23/02* (2006.01)
*H04L 25/02* (2006.01)

(56) References Cited

U.S. PATENT DOCUMENTS

| | | | |
|---|---|---|---|
| 9,402,256 | B2 | 7/2016 | Kim et al. |
| 2009/0203377 | A1 | 8/2009 | Kawasaki et al. |
| 2010/0118730 | A1 | 5/2010 | Tanaka et al. |
| 2011/0128909 | A1* | 6/2011 | Luo ............... H04L 27/26134 370/328 |
| 2012/0082252 | A1* | 4/2012 | Annavajjala ........ H04L 5/0007 375/260 |
| 2014/0140423 | A1 | 5/2014 | Muralidhar et al. |
| 2014/0286318 | A1 | 9/2014 | Senoo et al. |
| 2015/0381331 | A1* | 12/2015 | Kim .................. H04L 5/0023 370/329 |
| 2016/0029331 | A1* | 1/2016 | Seo ................. H04L 27/2613 370/350 |
| 2016/0119092 | A1 | 4/2016 | Mun et al. |
| 2016/0127922 | A1 | 5/2016 | Krishnamoorthy et al. |
| 2016/0143055 | A1* | 5/2016 | Nammi .............. H04B 7/0684 370/329 |
| 2016/0205677 | A1 | 7/2016 | Kim et al. |
| 2016/0211959 | A1 | 7/2016 | Jongren et al. |
| 2016/0242170 | A1 | 8/2016 | Xu et al. |
| 2018/0048507 | A1 | 2/2018 | Wang et al. |
| 2018/0110041 | A1* | 4/2018 | Bendlin ............. H04B 1/7143 |

OTHER PUBLICATIONS

International Search Report and Written Opinion—PCT/US2017/046015—ISA/EPO—dated Oct. 26, 2017.

"LTE; Evolved Universal Terrestrial Radio Access (E-UTRA); Physical Channels and Modulation (3GPP TS 36.211 Version 10.4.0 Release 10)", Technical Specification. European Telecommunications Standards Institute (ETSI). 650, Route Des Lucioles; F-06921 Sophia-Antipolis; France, vol. 3GPP RAN 1. No. V10.4.0, Jan. 1, 2012 (Jan. 1, 2012), 103 Pages, XP014069597, A paragraph [6.10.5]—paragraph [6.10.6.3].

* cited by examiner

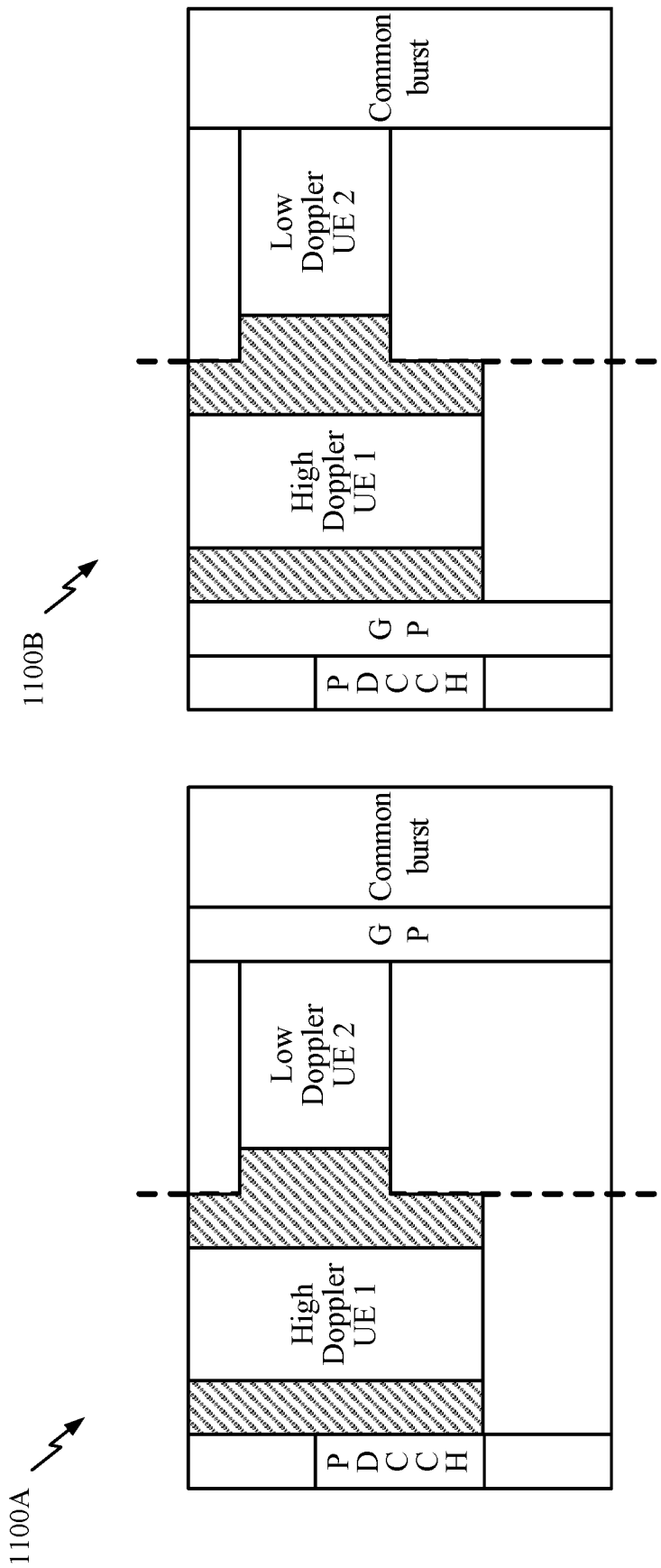

REFERENCE SIGNAL CONFIGURATIONS FOR DOPPLER SUPPORT IN NEW RADIO DESIGN

CLAIM OF PRIORITY UNDER 35 U.S.C. § 120

The present Application for Patent is a continuation of U.S. Non-Provisional patent application Ser. No. 15/671,184, filed Aug. 8, 2017, which claims priority to and benefit of U.S. Provisional Patent Application Ser. No. 62/373,259, filed Aug. 10, 2016, which are hereby assigned to the assignee hereof and hereby expressly incorporated by reference herein in their entireties as if fully set forth below and for all applicable purposes.

INTRODUCTION

Aspects of the present disclosure related generally to wireless communications systems, and more particularly, to co-existence of reliable low-latency services with other services in a wireless network.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

A wireless communication network may include a number of Node Bs that can support communication for a number of user equipments (UEs). A UE may communicate with a base station (e.g., a Node B) via the downlink and uplink. The downlink (or forward link) refers to the communication link from the Node B to the UE, and the uplink (or reverse link) refers to the communication link from the UE to the Node B.

These multiple access technologies have been adopted in various telecommunication standards to provide a common protocol that enables different wireless devices to communicate on a municipal, national, regional, and even global level. An example of an emerging telecommunication standard is new radio (NR, e.g., 5G radio access). NR is a set of enhancements to the LTE mobile standard promulgated by Third Generation Partnership Project (3 GPP). It is designed to better support mobile broadband Internet access by improving spectral efficiency, lower costs, improve services, make use of new spectrum, and better integrate with other open standards as well as support beamforming, multiple-input multiple-output (MIMO) antenna technology, and carrier aggregation. However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

In an aspect, a method for wireless communications is provided. The method may be performed, for example, by a base station. The method generally includes allocating at least a first set of resources to a first user equipment (UE), based on one or more mobility characteristics of the first UE (e.g., that relate to a Doppler measurement), wherein the first set of resources occupies a narrowband region of wider system bandwidth within at least one time slot of a subframe and communicating with the first UE based on reference signals (RSs) transmitted using the first set of resources.

In an aspect, a method for wireless communications is provided. The method may be performed, for example, by a wireless node. The method generally includes determining at least a first set of resources based on one or more mobility characteristics of the UE, wherein the first set of resources occupies a narrowband region of wider system bandwidth within at least one time slot of a subframe and communicating with a base station based on reference signals (RSs) transmitted using the first set of resources.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 11A, 11B, 12A, 12B, 13A, 13B, 14A, 14B, 15A, and 15B illustrate different RS configurations that may accommodate low rate UEs, in accordance with aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
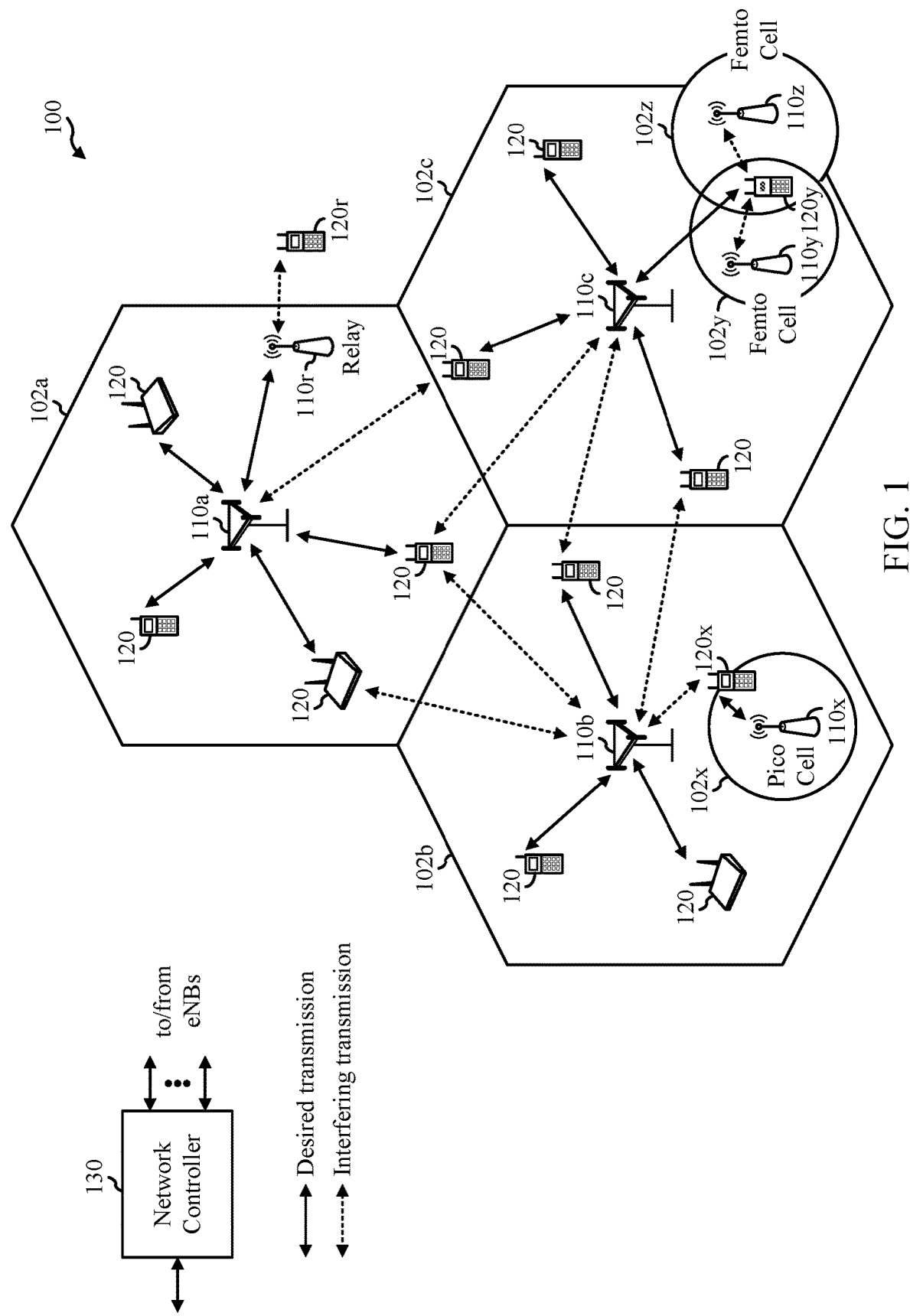
FIG. 1 is a block diagram conceptually illustrating an example telecommunications system, according to aspects of the present disclosure.

Aspects of the present disclosure provide apparatus, methods, processing systems, and computer program products for new radio (NR) (new radio access technology) cell measurement. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may include Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and mission critical targeting ultra reliable low latency communications (URLLC). For these general topics, different techniques are considered, such as coding, low-density parity check (LDPC), and polar. The term NR cell may refer to a cell operating according to the new air interface or fixed transport layer. A NR Node B (e.g., 5G Node B) may correspond to one or multiple transmission reception points (TRPs).

NR cells can be configured as access cell (ACells) or data only cells (DCells). For example, the RAN (e.g., a central unit or distributed unit) can configure the cells. Any type of NR cell may utilize UL and/or DL reference signals (RS) to aid in communication. Examples of such reference signals include demodulation reference signals (DMRS). DMRS is typically used for channel estimation and for coherent demodulation, for example, and is transmitted (on the UL) along with PUSCH and PUCCH. If DMRS is not decoded properly by a base station, PUSCH or PUCCH may not be not decoded well.

Aspects of the present disclosure provide configurations for reference signals, such as DMRS, that may account for mobility characteristics of a wireless node (e.g., a UE), such as Doppler measurements indicating how fast such a device is moving.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting and the scope of the disclosure is being defined by the appended claims and equivalents thereof.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. ABS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, gNB, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. ABS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a healthcare device, a biometric sensor/device, a wearable device such as a smart watch, smart clothing, smart glasses, virtual reality goggles, a smart wrist band, smart jewelry (e.g., a smart ring, a smart bracelet, etc.), an entertainment device (e.g., a music device, a video device, a satellite radio, etc.), a vehicular component or sensor, a smart meter/sensor, a robot, a drone, industrial manufacturing equipment, a positioning device (e.g., GPS, Beidou, terrestrial), or any other suitable device that is configured to communicate via a wireless or wired medium. Some UEs may be considered machine-type communication (MTC) devices or evolved MTC (eMTC) devices, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. MTC and eMTC UEs include, for example, robots, drones, remote devices, sensors, meters, monitors, cameras, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. MTC UEs, as well as other UEs, may be implemented as Internet-of-Things (IoT) devices, e.g., narrowband IoT (NB-IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (e.g., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a cyclic prefix (CP) on the uplink and downlink and include support for half-duplex operation using time division duplex (TDD). A single component carrier bandwidth of 100 MHz may be supported. NR resource blocks may span 12 subcarriers with a sub-carrier bandwidth of 75 kHz over a 0.1 ms duration (or other durations). Each radio frame may consist of 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
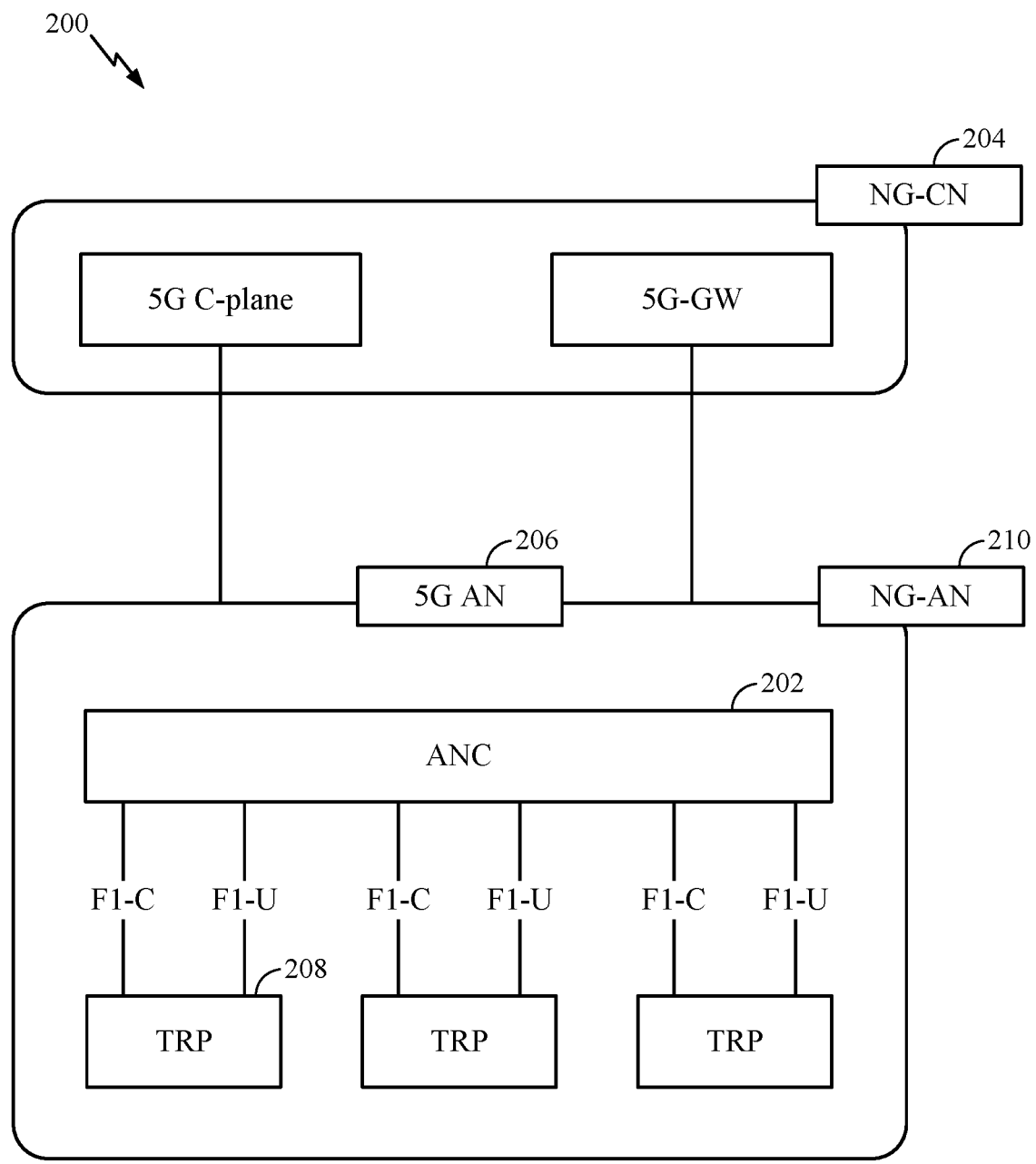
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, gNBs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
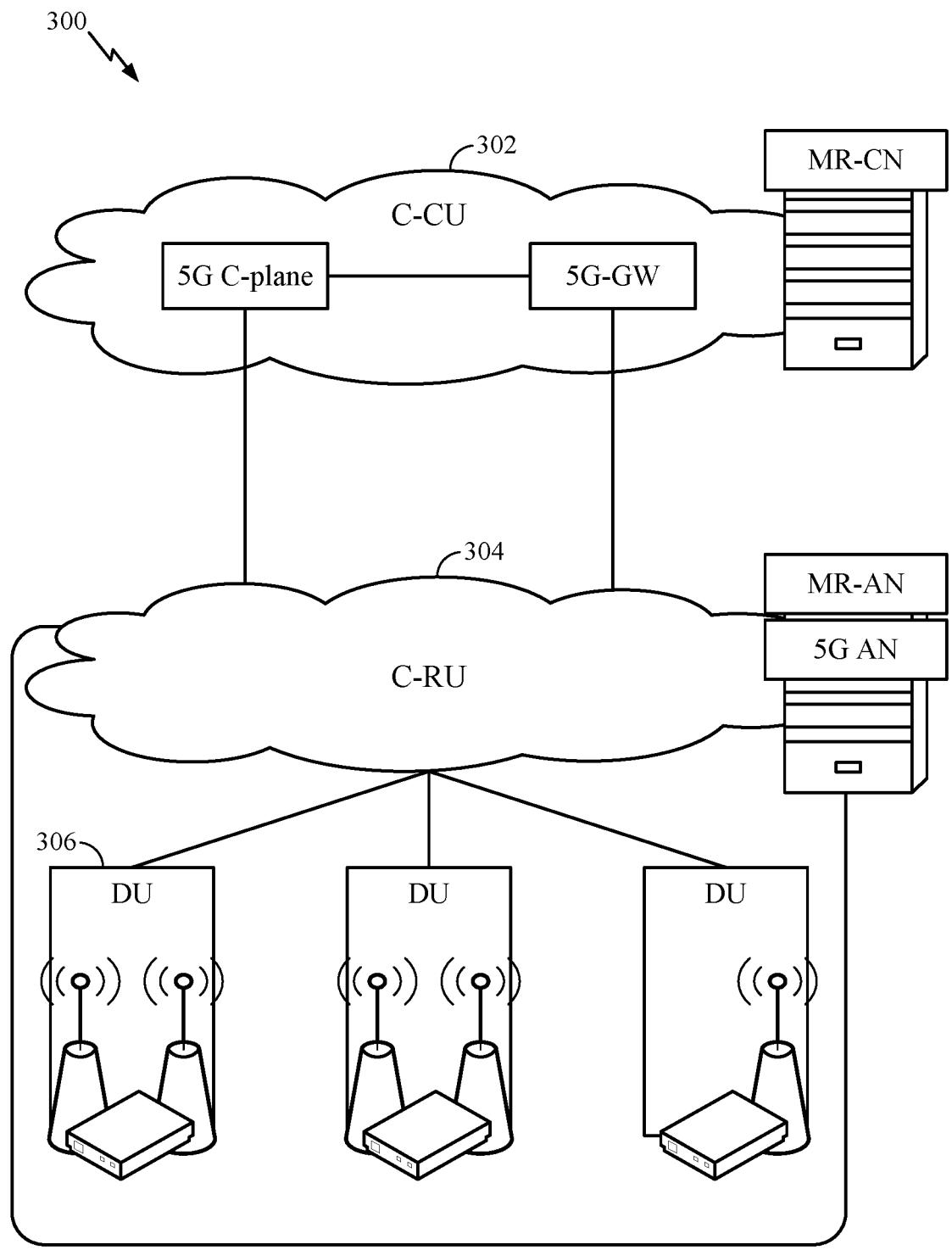
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
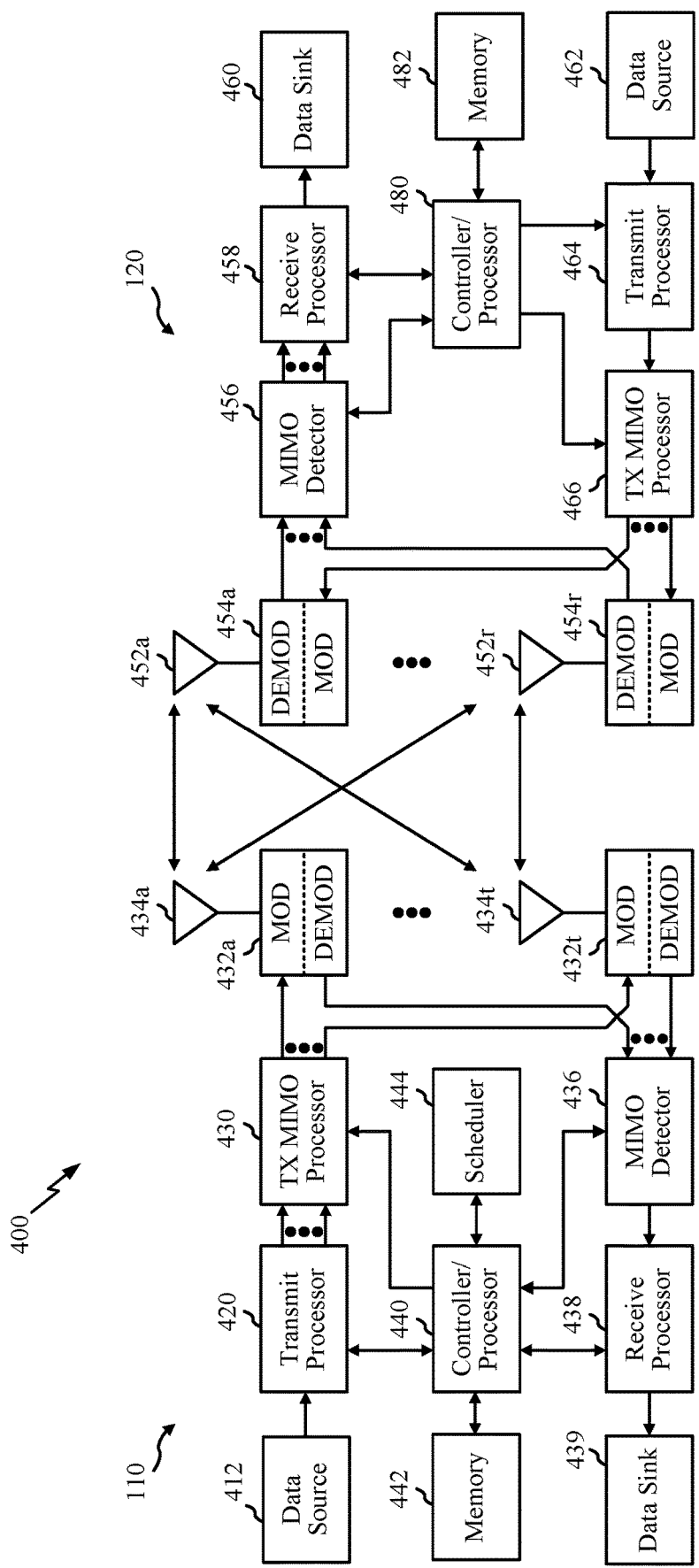
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, processors 466, 458, 464, and/or controller/processor 480 of the UE 120 and/or antennas 434, processors 430, 420, 438, and/or controller/processor 440 of the BS 110 may be used to perform the operations described herein and illustrated with reference to FIGS. 10 and 11.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processings can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct the processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
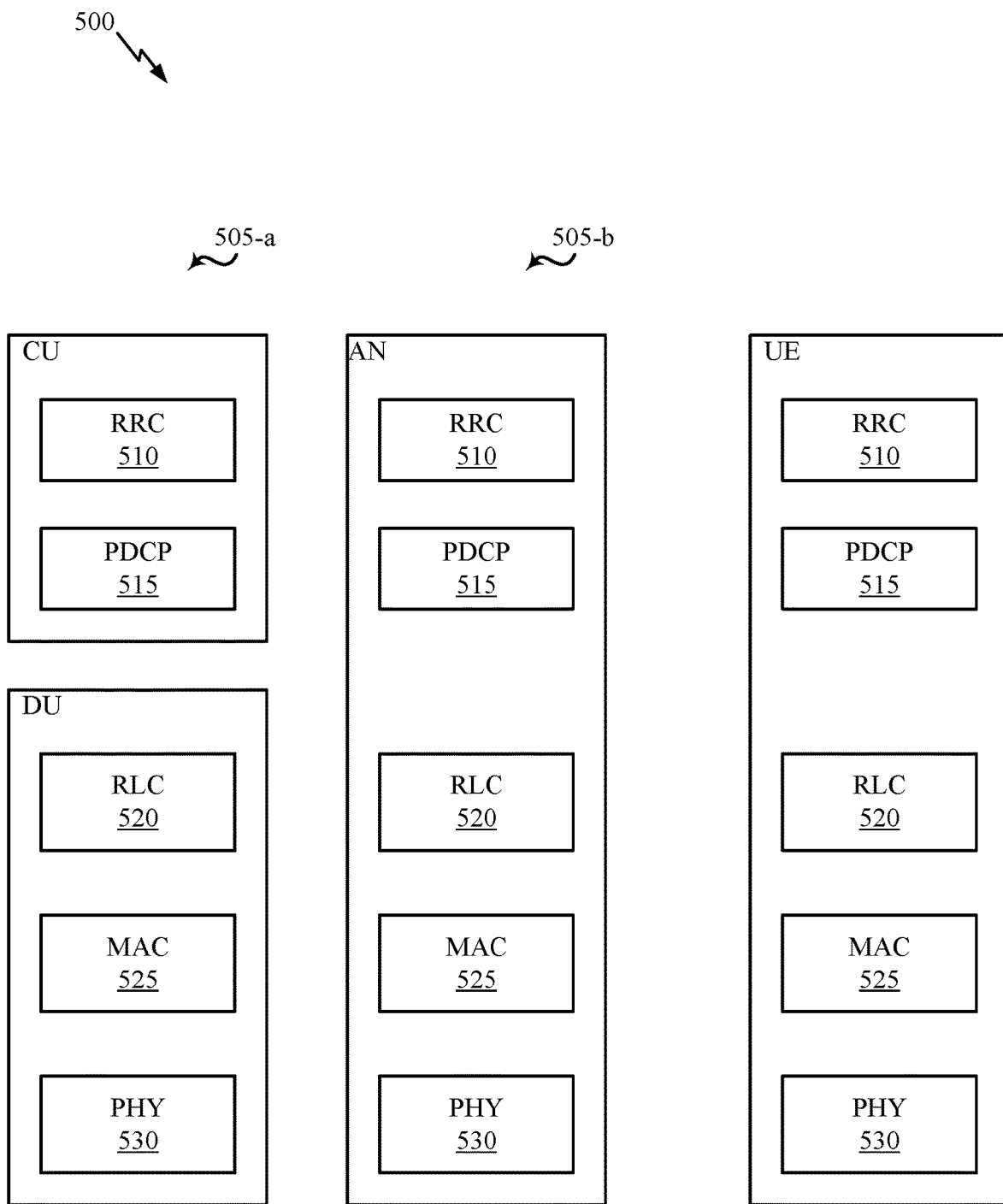
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a central unit (CU) or centralized network access device (e.g., an ANC 202 in FIG. 2) and a distributed unit (DU) or distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
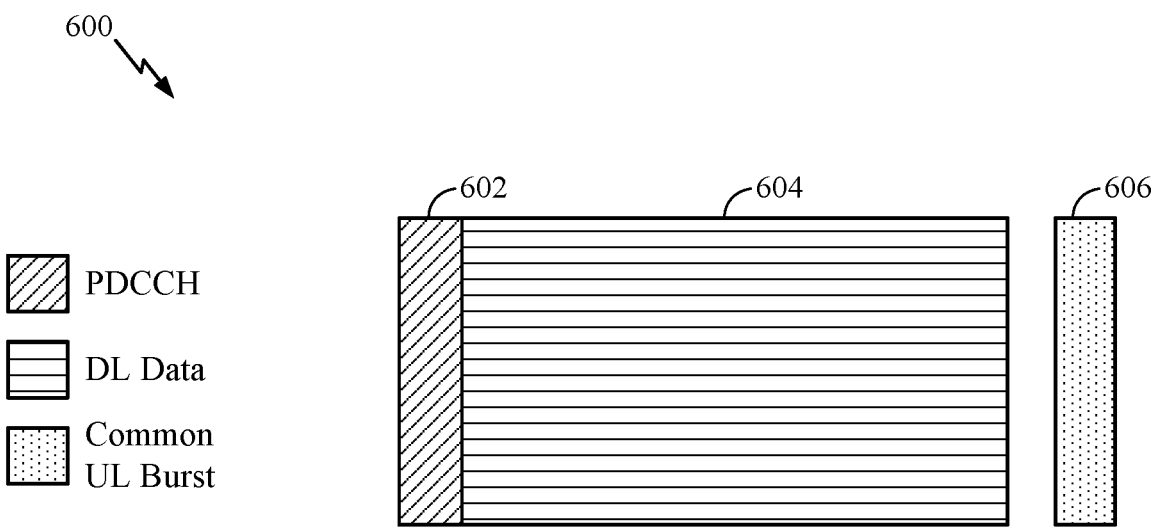
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated (discontiguous or with no overlap, not overlapping) in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 6A:
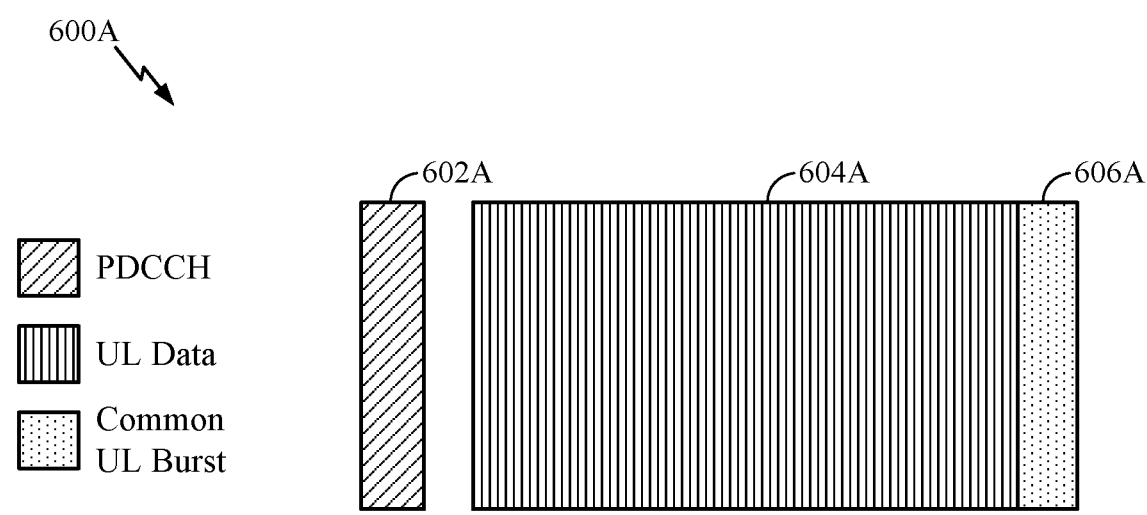
FIG. 6A illustrates an example of an UL-centric subframe, in accordance with certain aspects of the present disclosure.

FIG. 6A is a diagram 600A showing an example of an UL-centric subframe. The UL-centric subframe may include a control portion 602A. The control portion 602A may exist in the initial or beginning portion of the UL-centric subframe. The control portion 602A in FIG. 6A may be similar to the control portion described above with reference to FIG. 6. The UL-centric subframe may also include an UL data portion 604A. The UL data portion 604A may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 602A may be a physical DL control channel (PDCCH).

As illustrated in FIG. 6A, the end of the control portion 602A may be separated in time from the beginning of the UL data portion 604A. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 606A. The common UL portion 606A in FIG. 6A may be similar to the common UL portion 606A described above with reference to FIG. 6A. The common UL portion 606A may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Reference Signal Configurations for Doppler Support in New Radio Design

Mechanisms used to achieve high speed and low latency objectives of wireless systems, such as 5G systems, often work in conflict. Non-causal channel estimation may be employed, for example, with a limited number of tones available for reference signals leading to interpolation (between RS tones) or extrapolation (past RS tone edges), which may not be reliable enough to provide sufficient performance. Other factors, such as fast channel fading and channel model mismatch may also hinder performance.

In some cases, fast turnaround (processing) may be attempted with a "self contained" structure, such as the structures shown in FIGS. 6 and 6A, that is front loaded with DMRS (e.g., with channel estimation performed at the front end of a subframe time slot used to for causal channel estimation). For high data rate transmissions, CE based on wideband RS may span all symbols in a slot or subframe. Certain operating conditions may present challenges however. For example, with such techniques, it may be difficult to support high Doppler, fast turnaround, and peak throughput at the same time.

Aspects of the present disclosure, however, present subframe structures with RS configurations that may adapt based on UE mobility characteristics (such as Doppler). As such, the techniques presented herein may help adapt RS configurations to support various different scenarios, such as: 1) a High Doppler, fast turnaround, low data rate scenario; 2) a High Doppler, high rate, delayed acknowledgment (ACK) scenario, or 3) a Low Doppler, fast turnaround, high rate scenario. As will be described herein, RS locations may be subsequently moved (e.g., locations may differ in the different RS configurations e.g, mapped with locations occurring before or later than previously mapped) in an effort to better accommodate each scenario.

Figure 7:
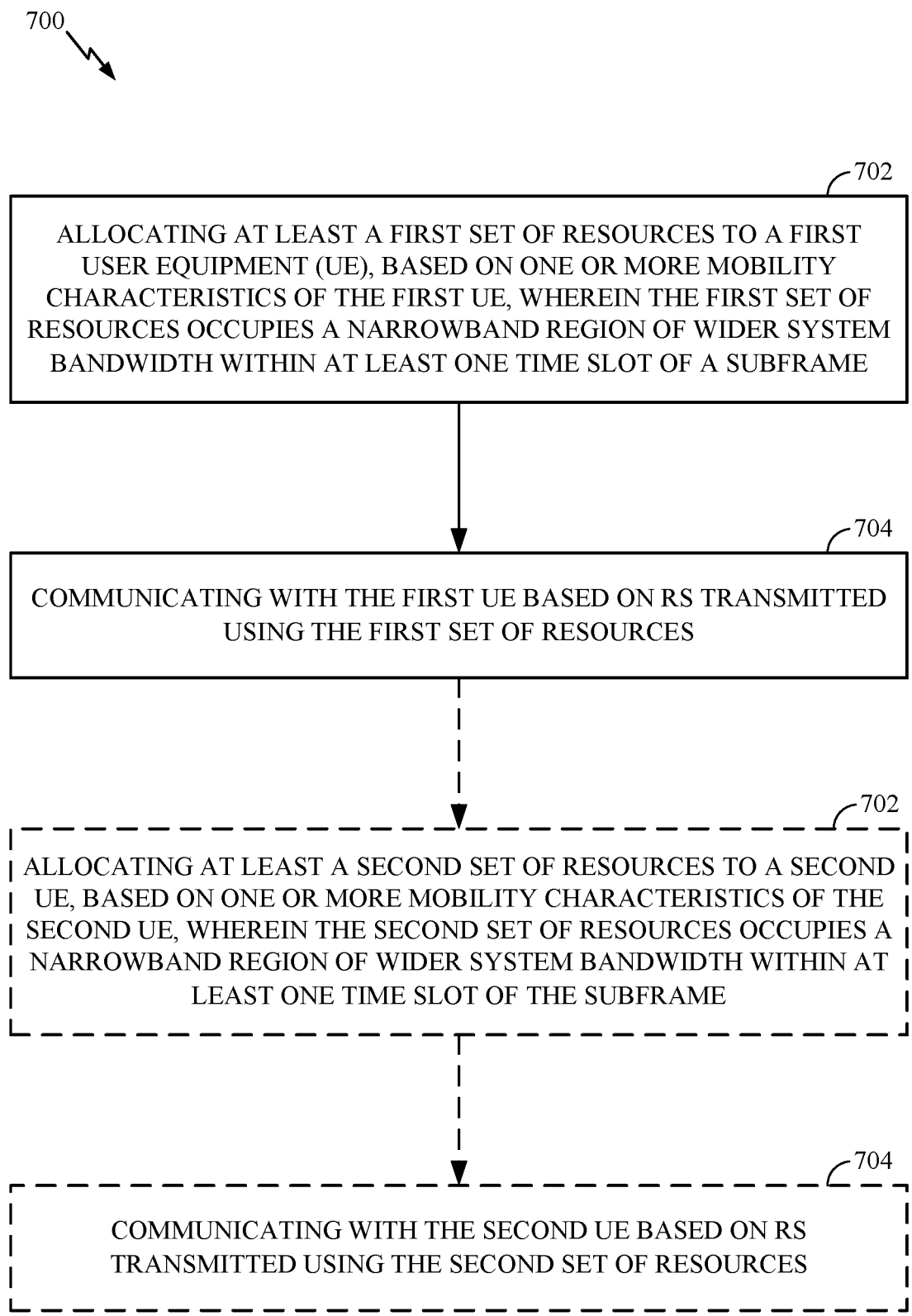
FIG. 7 illustrates example operations for wireless communications by a base station, according to aspects of the present disclosure.

FIG. 7 illustrates example operations 700 for wireless communications by a base station, according to aspects of the present disclosure. The operations 700 may be performed, for example, by a base station (e.g., base station/Node B 110).

Operations 700 begin, at 702, by allocating at least a first set of resources to a first user equipment (UE), for reference signals (RSs) based on one or more mobility characteristics of the first UE, wherein the first set of resources occupies a narrowband region of wider system bandwidth within at least one time slot of a subframe. At 704, the BS communicates with the first UE based on RS transmitted using the first set of resources.

Figure 8:
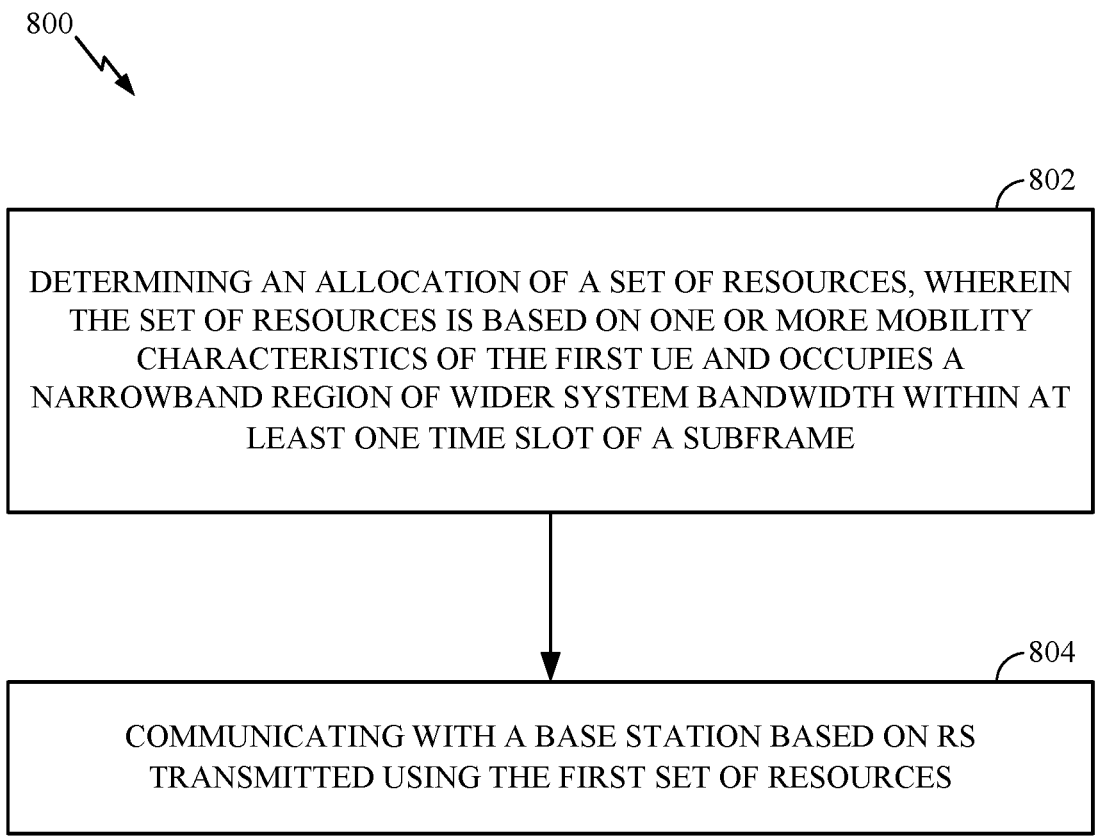
FIG. 8 illustrates example operations for wireless communications by a user equipment (UE), according to aspects of the present disclosure.

FIG. 8 illustrates example operations 800 for wireless communications by wireless node, according to aspects of the present disclosure. Operations 800 may be considered complementary to operations 700 described above. In other words, operations 800 may be performed by a wireless node (e.g., UE 120) communicating with a base station performing operations 700.

Operations 800 begin, at 802, by determining at least a first set of resources for reference signals (RSs) based on one or more mobility characteristics of the UE, wherein the first set of resources occupies a narrowband region of wider system bandwidth within at least one time slot of a subframe. At 804, the wireless node communicating with a base station based on RS transmitted using the first set of resources.

As will be described herein, "regular" transmission bursts may be divided into 2 slots, which can be assigned to a single user or multiple (e.g., two or more) users. In some cases, one of two DMRS may be indicated by one bit in grant.

As noted above, different RS configurations described herein may locate RS differently in an effort to better accommodate UEs with different mobility and usage scenarios.

Figure 9B:
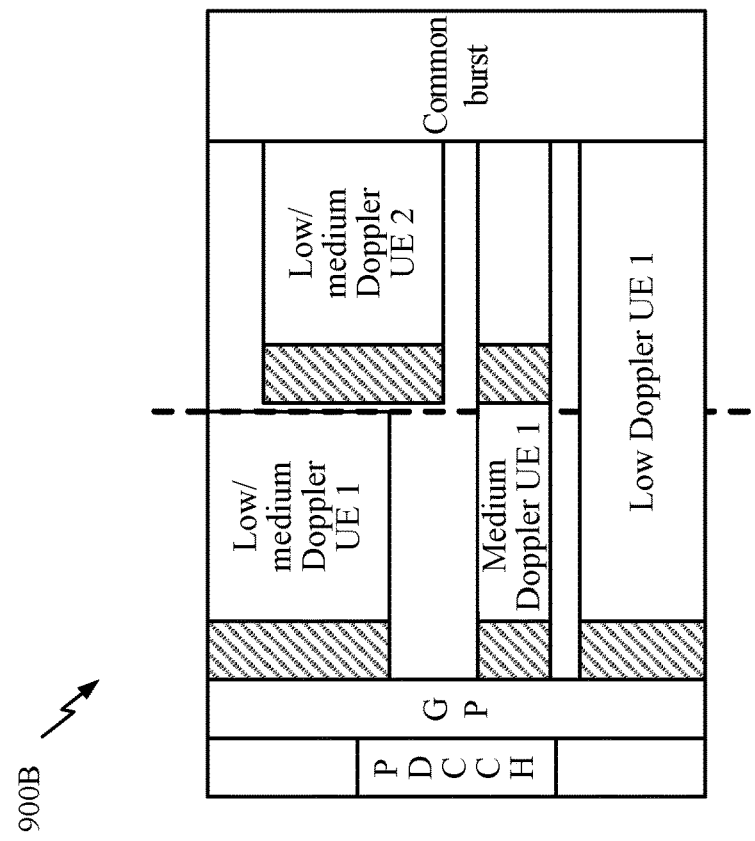
FIGS. 9A, 9B, 10A, and 10B illustrate different RS configurations, in accordance with aspects of the present disclosure.
Figure 9A:
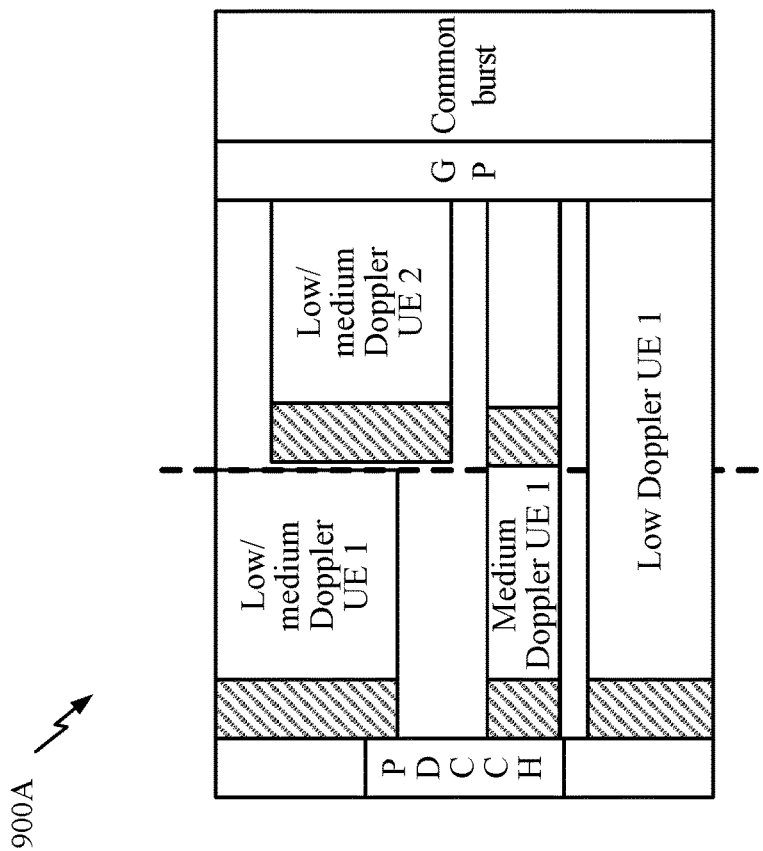

For example, FIGS. 9A and 9B illustrate different RS configurations 900A and 900B with one DMRS (per user) per slot. For the sake of illustration, relative Doppler ranges are used, including Low, Medium, and High. Each range may be defined by one or more thresholds. For example, Low Doppler may be defined as a Doppler measurement below a first threshold value, Medium Doppler may be bound by the first threshold and a second threshold value, while High Doppler may be above (greater than) the second threshold.

As illustrated in FIGS. 9A and 9B, RS resources for Low or Medium Doppler UEs can be assigned to either time slot or both time slots of a subframe. For Medium Doppler UEs, it may be assumed that one DMRS symbol per slot (for DL and/or UL) is sufficient. For low Doppler, one DMRS front loaded per transmission (spanning both slots) may be sufficient.

As illustrated in FIG. 9A, a guard period may be used (between a last symbol for a UE and a common burst region). As illustrated in FIG. 9B, in some cases, the guard period may be positioned prior to front-loaded DMRS symbols.

Figures 10A, 10B:
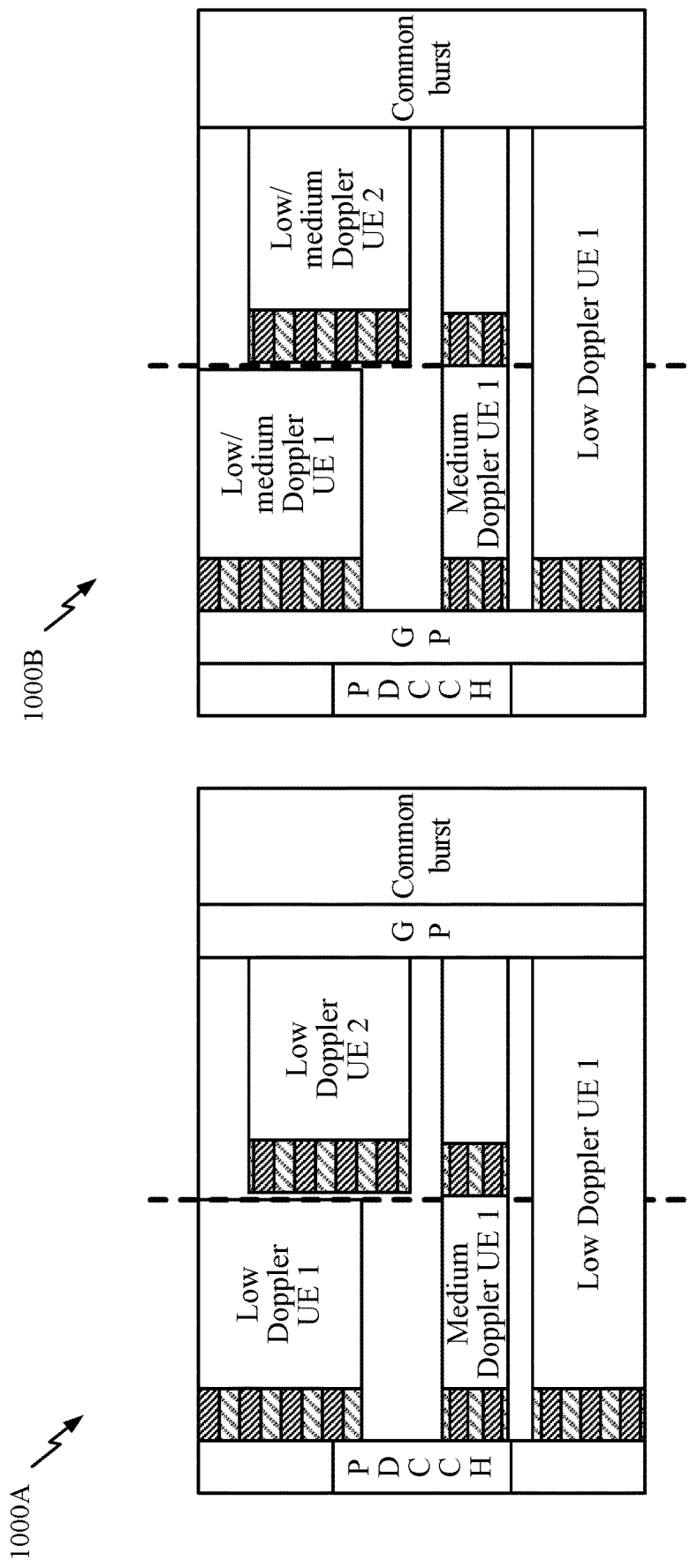

As illustrated in FIGS. 10A and 10B, to reduce RS overhead, certain RS configurations 1000A and 1000B may use OFDM based RS symbols. The exact ratio of RS to data may depend on various factors. Again, a guard period may be located between the last symbol for a UE and the common burst region (1000A) or may be positioned prior to front-loaded DMRS symbols (1000B).

As illustrated in FIGS. 11A and 11B, certain RS configurations 1100A and 1100B, may assign RS resources in the first slot to a high Doppler fast turnaround low rate UE, while a lower Doppler UE may be assigned (less or more) RS resources in the second slot. As illustrated, the high Doppler UE may have more than one RS symbol (e.g., first and last symbols in the first slot), while the lower Doppler UE may have a single RS symbol. The exact number and locations of RS symbols (e.g., more or fewer symbols) may be optimized based on various factors, and may be symmetric between DL and UL.

Figure 12B:
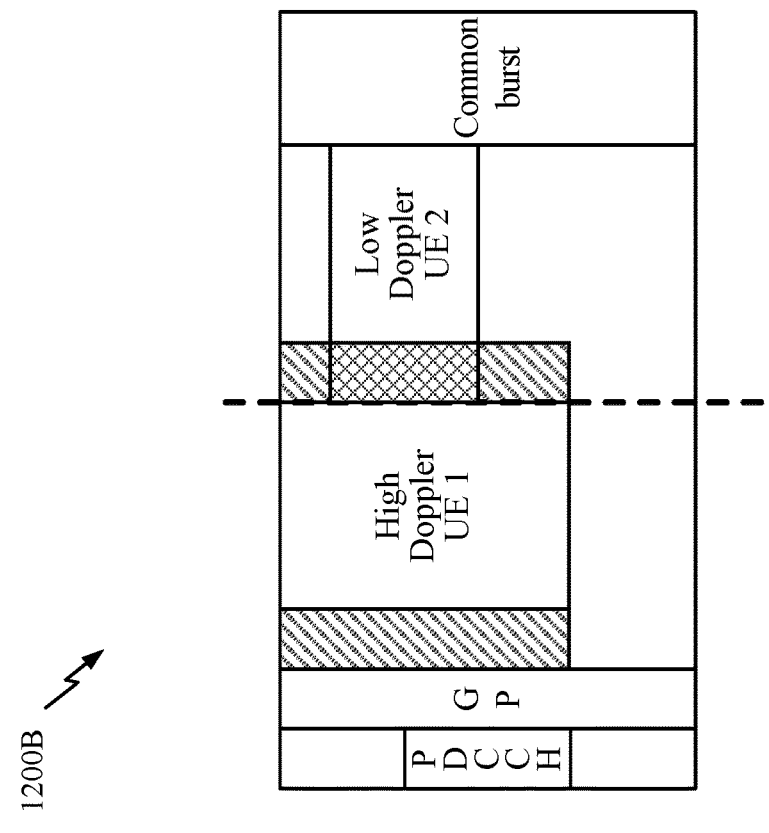
Figure 12A:
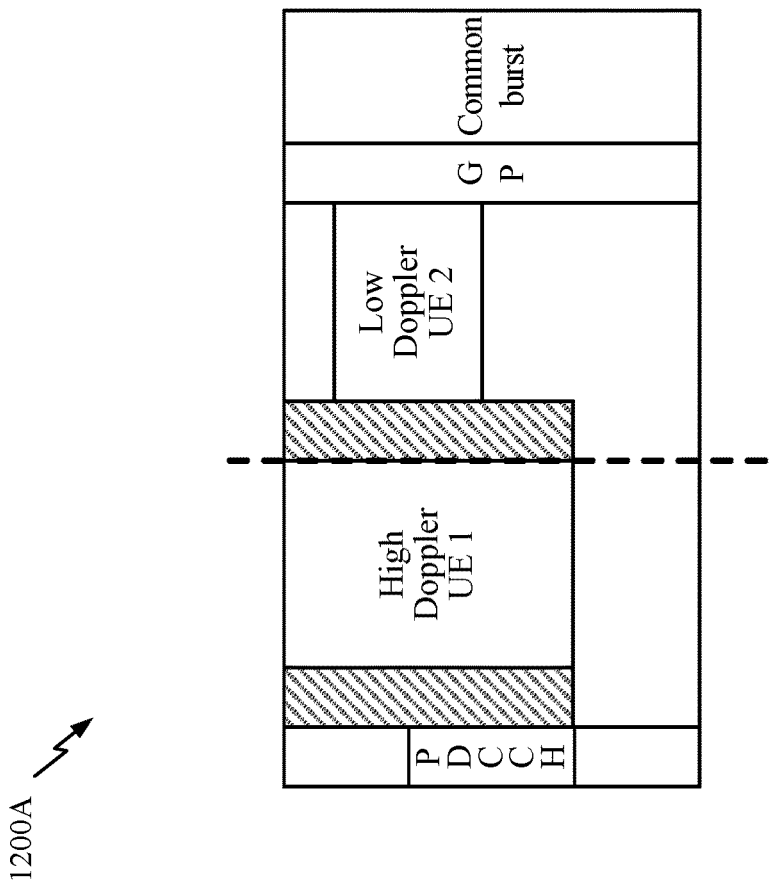

As illustrated in FIGS. 12A and 12B, in some cases, for certain RS configurations 1200A and 1200B, a second RS symbol for a high Doppler UE may occur in the second slot. For DL, DMRS may be transmitted in the second slot to allow for interpolation. When possible, a high Doppler UE may be paired with a low Doppler, low rate UE (could be fast or slow turnaround). For UL, code division multiplexing (CDM) may be used to allow for DMRS multiplexing of multiple UEs and may allow CDM of different bandwidths, and may use RB level Chu or CGS sequence based DMRS. In some cases, Interleaved Frequency Division Multiplexing. (IFDM) may be used, and two UEs may use different tones.

Figure 13B:
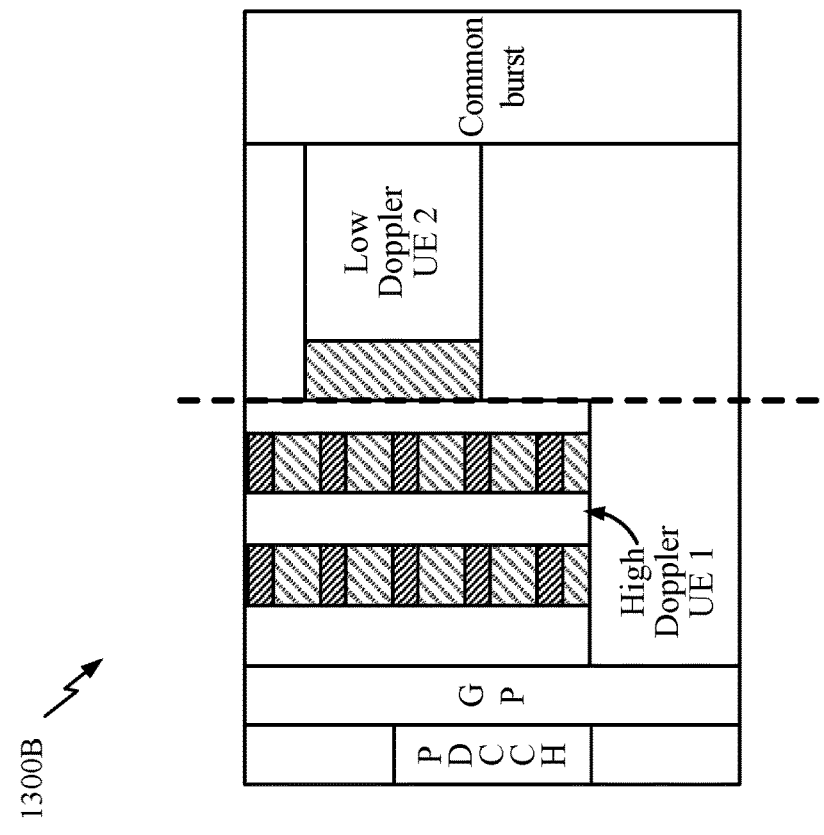
Figure 13A:
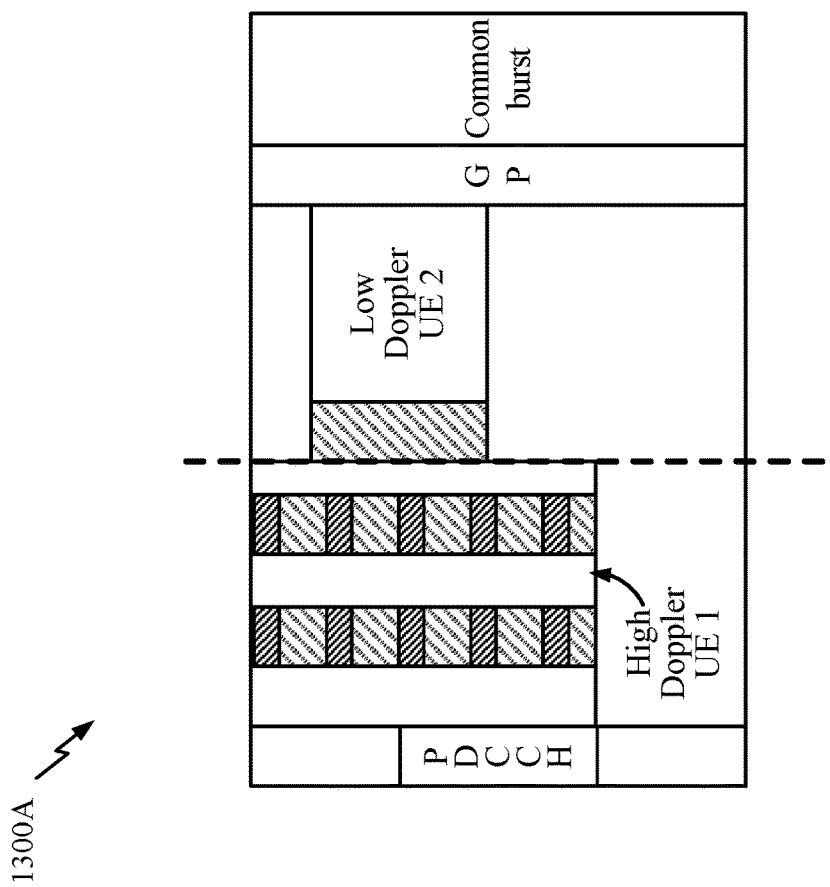

FIGS. 13A and 13B illustrate example RS configurations 1300A and 1300B of a High Doppler fast turnaround low rate UE assigned RS resources in the first slot. In this example, DL/UL may both have more than two DMRS symbols. Again, to reduce RS overhead, OFDM waveforms may be used and the number of DMRS symbols, locations, and RS/data ratio may also be optimized.

Figures 14A, 14B:
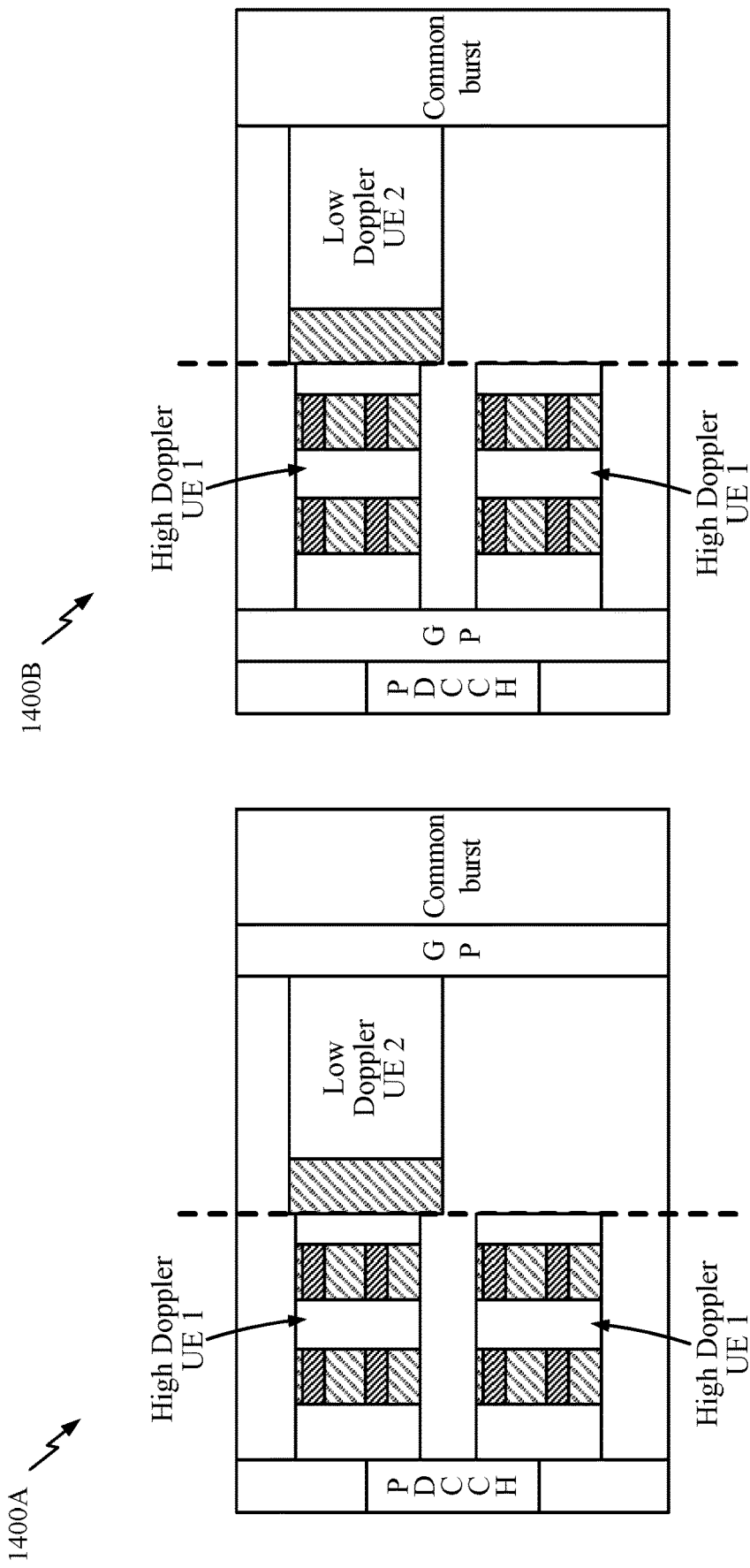

FIGS. 14A and 14B illustrate example RS configurations 1400A and 1400B may assign RS resources of the first slot to a High Doppler fast turnaround low rate UE. In this example, multi-cluster transmissions with OFDM based RS symbols are shown. Sounding reference signals (SRS) may not be sent frequently enough to select the best frequency band, but multi-cluster transmissions may provide sufficient frequency diversity. To reduce RF leakage, cluster distance may be reduced or the number of clusters may be increased. Data waveform may be either OFDM or SC-FDM.

Figure 15A:
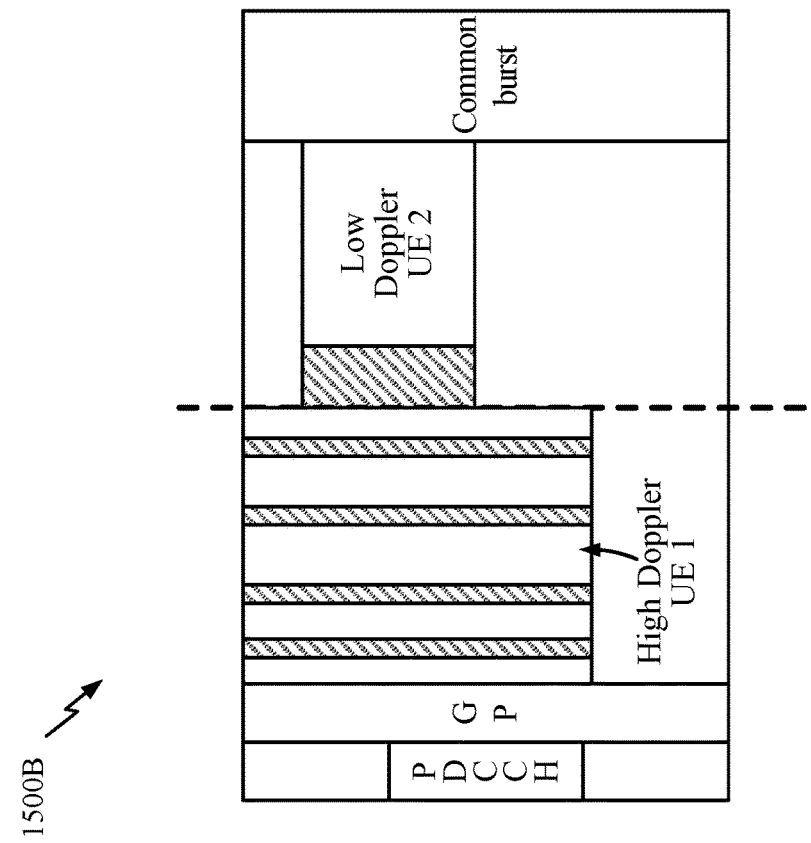
Figure 15B:
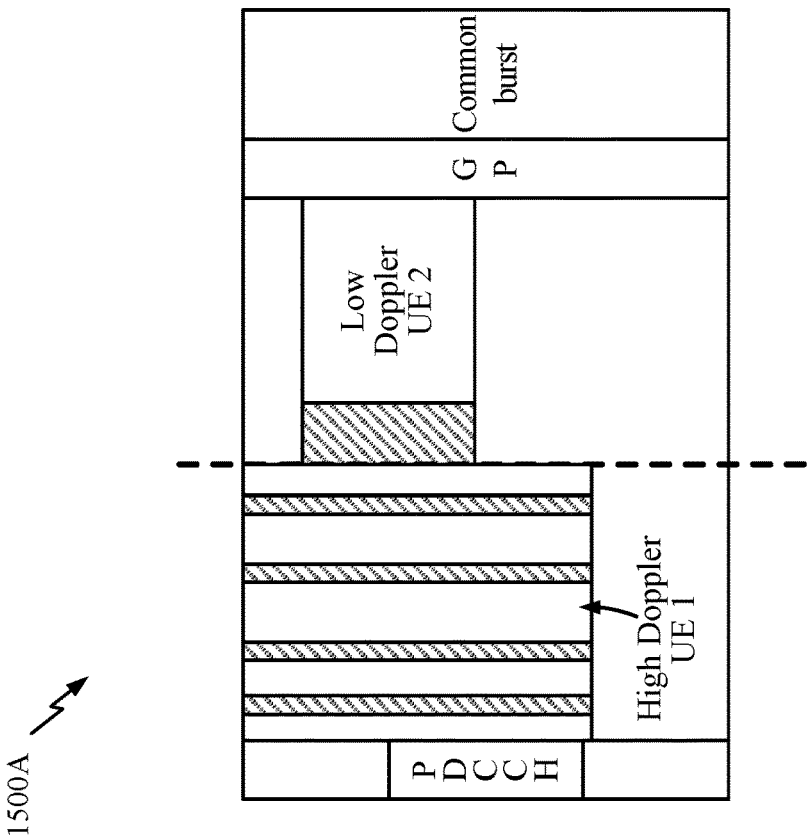

FIGS. 15A and 15B illustrate other example RS configurations 1500A and 1500B for a High Doppler fast turn-around low rate UE assigned RS resources of the first slot. In this example, DMRS symbols and data symbols may have different tone spacing and/or CP length (e.g., RS symbols with double tone spacing/half CP length). In some cases, time division multiplexing (TDM) may be used to avoid mutual interference with other UEs. When FDM'd with other low Doppler UEs, enough guard tones may be left to reduce mutual interference.

Figure 16B:
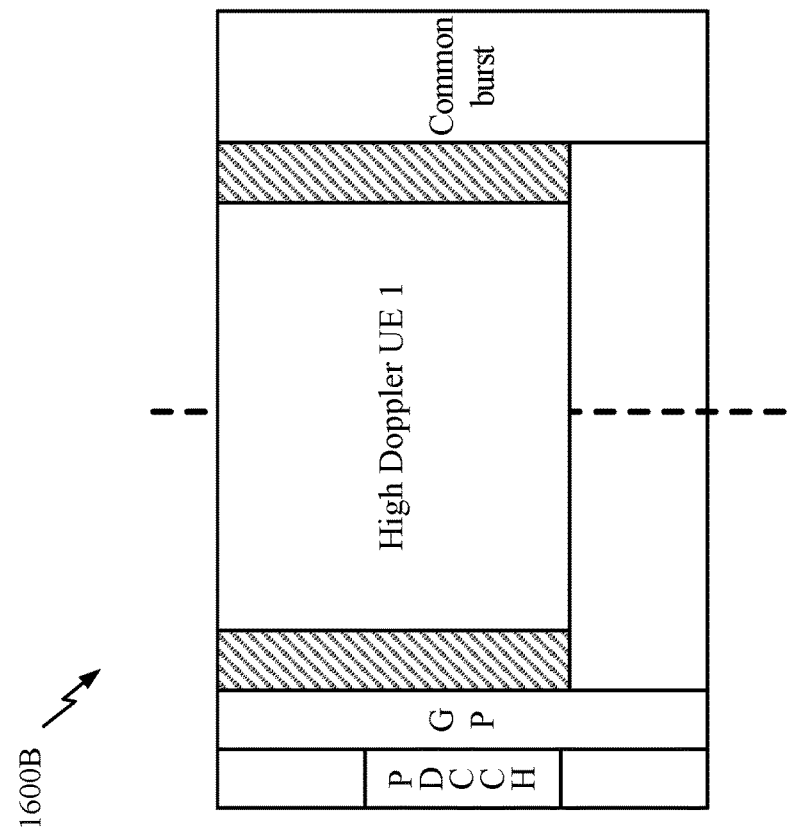
FIGS. 16A, 16B, 17A, 17B, 18A, and 18B illustrate different RS configurations that may accommodate high rate UEs, in accordance with aspects of the present disclosure.
Figure 16A:
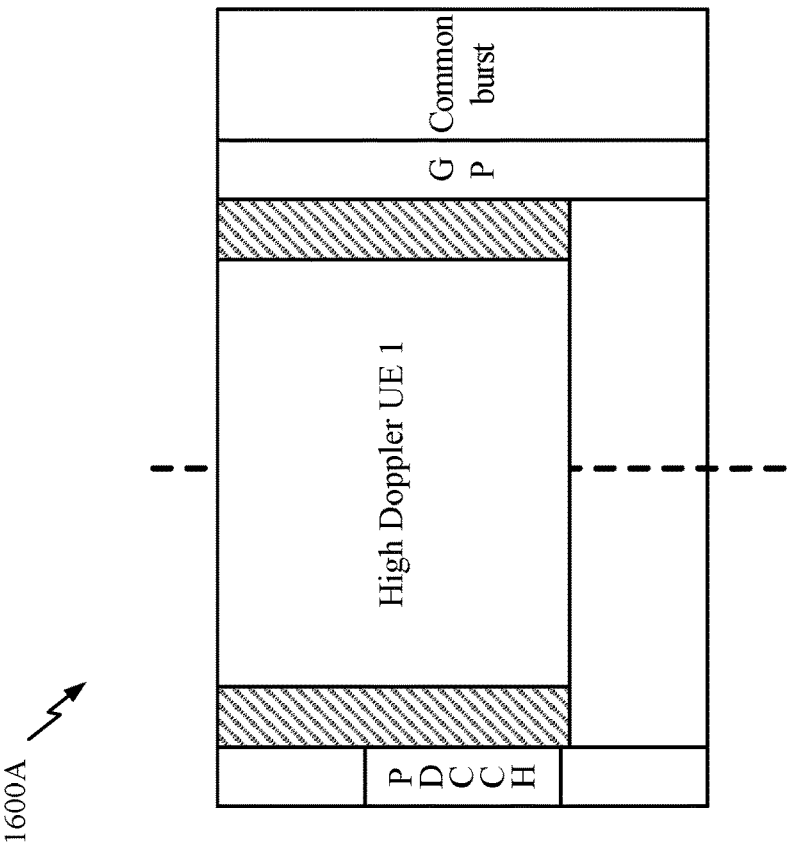
Figure 17B:
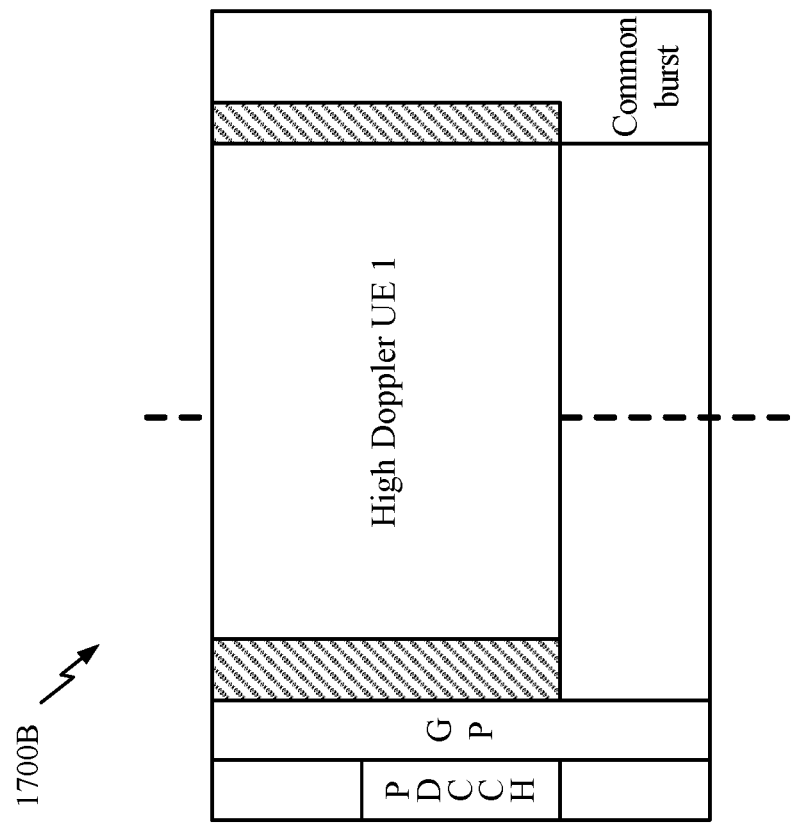
Figure 17A:
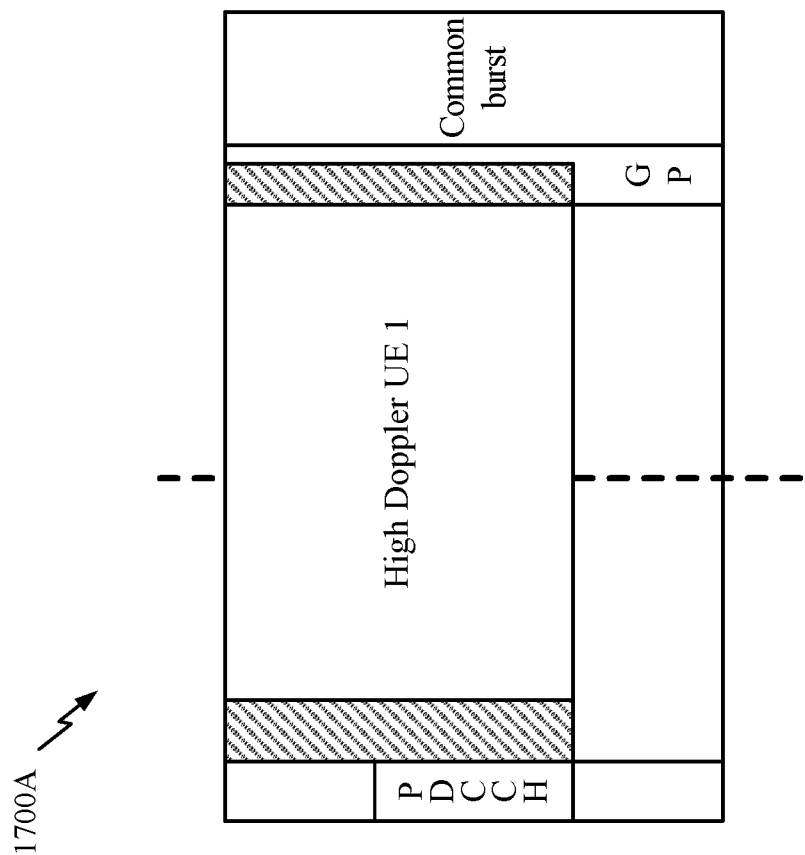
Figures 18A, 18B:
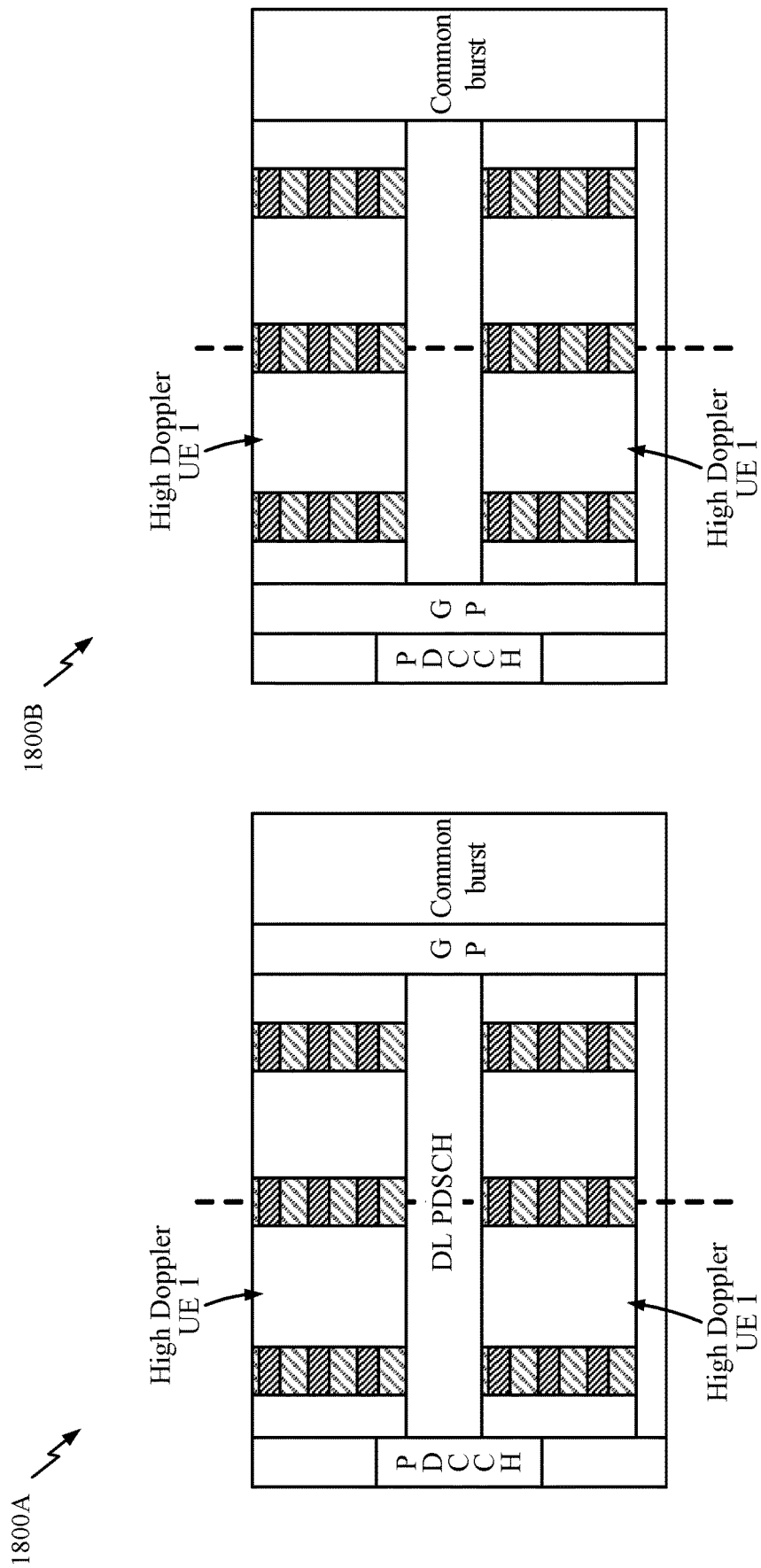

FIGS. 16A and 16B illustrate example RS configurations 1600A and 1600B for a High Doppler slow turnaround high rate UE assigned to the both slots. In this example, a front loaded DMRS symbol in the first slot may be assigned, as well as a back-loaded DMRS symbol in the second slot. As illustrated in FIGS. 17A and 17B, in some cases for DMRS, an RS configuration 1700A may have a back-loaded half symbol located in the guard period, while an RS configuration 1700B may have a half symbol located in the common burst region. As illustrated in FIGS. 18A and 18B, for RS configurations 1800A and 1800B, clustered regions may be used, OFDM-based symbols may be used, and the RS symbols may include a symbol across the boundary between slot 1 and slot 2.

Figures 19A, 19B:
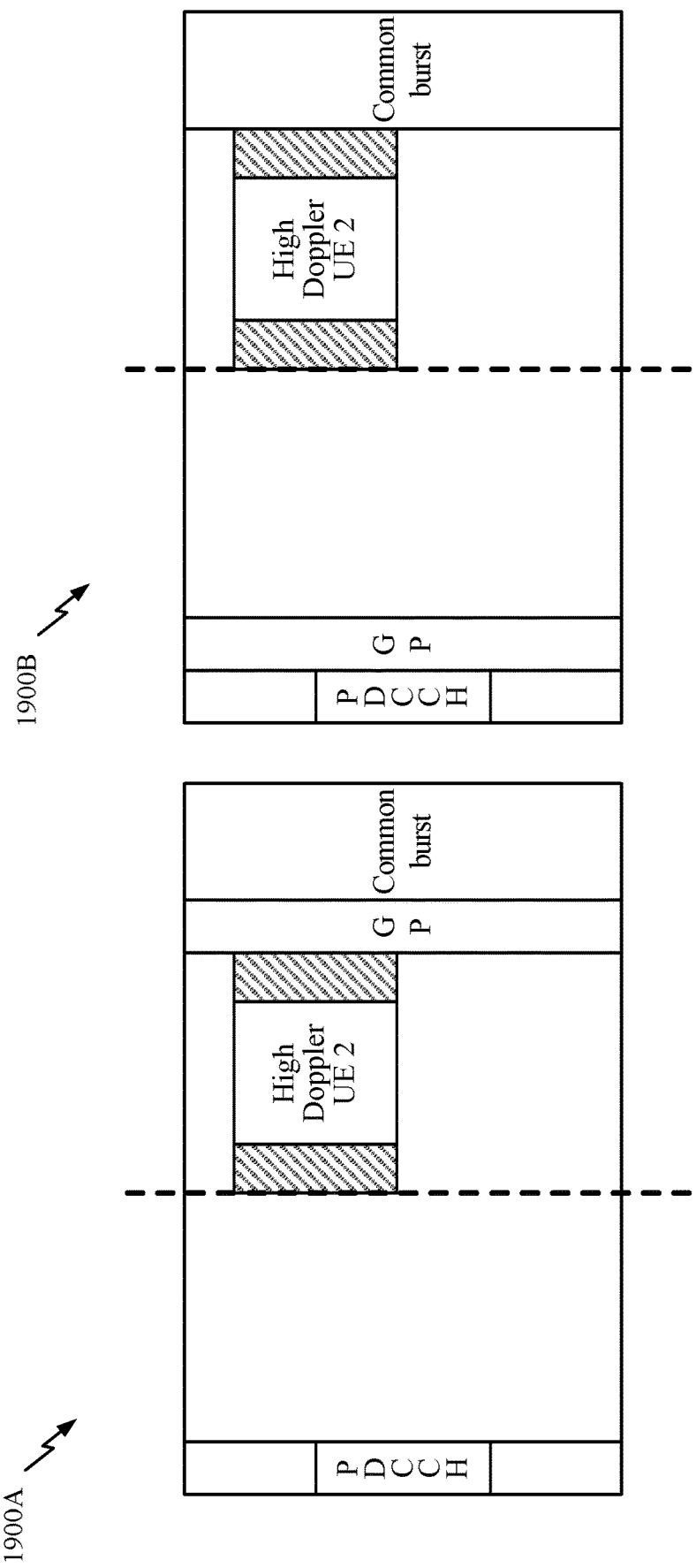
FIGS. 19A and 19B illustrate an example RS configuration that may accommodate a low rate UE assigned to a second slot, in accordance with aspects of the present disclosure.

FIGS. 19A and 19B illustrate example RS configurations 1900A and 1900B for a High Doppler slow turnaround low rate UE assigned to the second slot. In some cases, for DL and/or UL, one back-loaded DMRS may be added. In some cases (e.g., on DL), a half symbol of GP may be used to transmit DMRS, while for UL, a half symbol of common burst may be used to transmit DMRS. In some cases, a multi-cluster OFDM based transmission may be used.

Figure 20A:
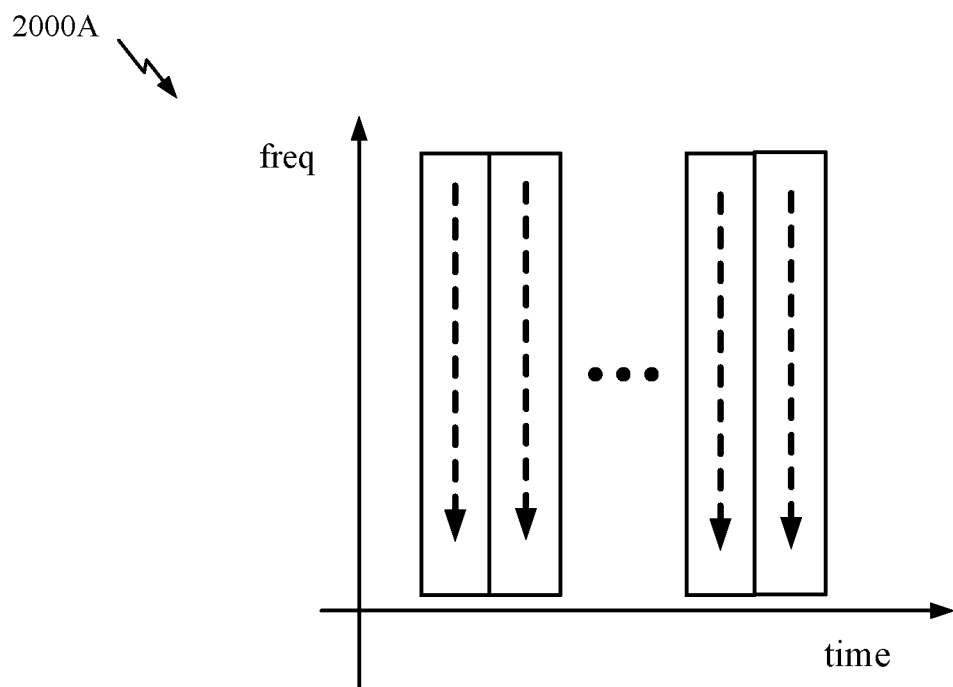
FIGS. 20A and 20B illustrate different resource mappings, in accordance with aspects of the present disclosure.
Figure 20B:
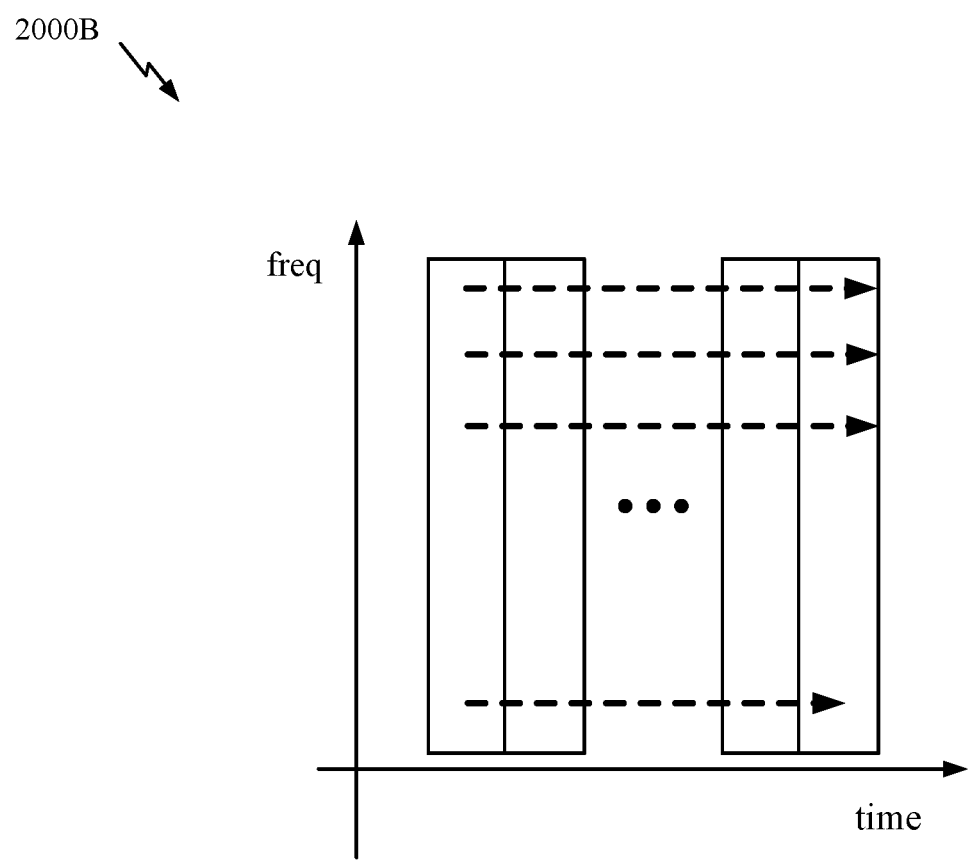

FIGS. 20A and 20B illustrate different resource mappings (via a mapping algorithm), in accordance with aspects of the present disclosure. As illustrated in FIG. 20A, a mapping 2000A for a fast turnaround channel may map modulated data symbols using a "tone first" and "symbol next" mapping, which may result in faster decoding results. As illustrated in FIG. 20B, a mapping 2000B for a slow turnaround channel, where decoding delay may not be a concern, a "symbol first" mapping may be used to achieve more frequency diversity.

Figure 21A:
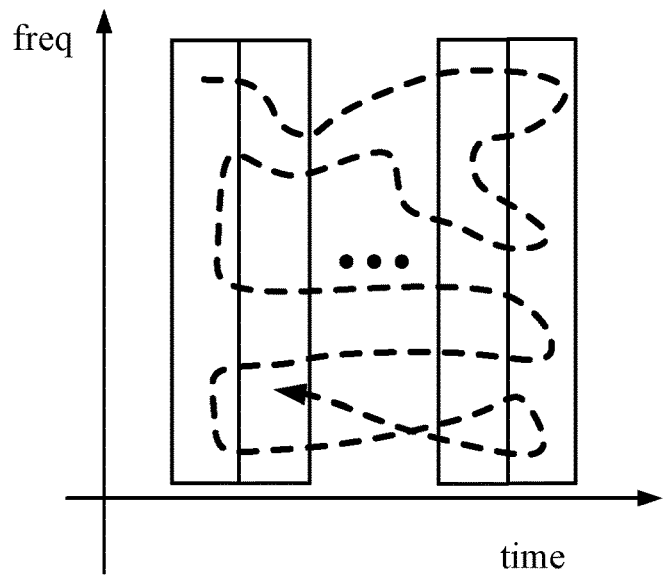
FIGS. 21A and 21B illustrate an example random resource mapping and a possible implementation for the same, in accordance with aspects of the present disclosure.
Figure 21B:
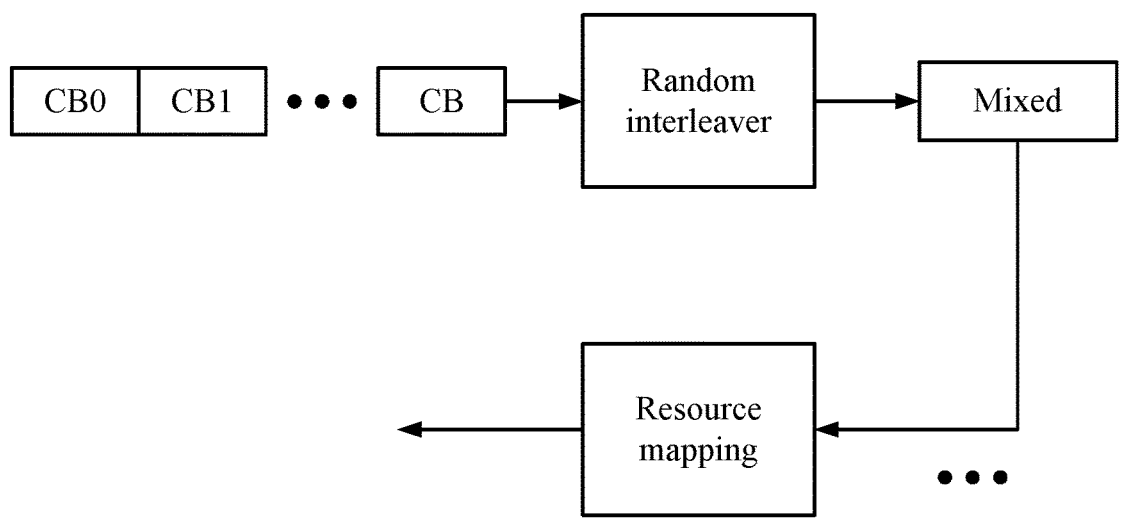

As illustrated in FIG. 21A, in some cases, a random (or pseudo-random) mapping 2100A across multiple Code-Blocks may be used, for example, for a slow turnaround channel, where decoding delay may not be a concern. As illustrated in FIG. 21B, one possible implementation 2100B for this approach, may utilize an interleaver to map resources from different CodeBlocks.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for determining a maximum available transmit power of the UE, instructions for semi-statically configuring a first minimum guaranteed power available for uplink transmission to a first base station and a second minimum guaranteed power available for uplink transmission to a second base station, and instructions for dynamically determining a first maximum transmit power available for uplink transmission to the first base station and a second maximum transmit power available for uplink transmission to the second base station based, at least in part, on the maximum available transmit power of the UE, the first minimum guaranteed power, and the second minimum guaranteed power.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communication by a base station, comprising:
   allocating a first set of resources to at least two reference signal (RS) symbols in a subframe for a first user equipment (UE), wherein:
      for downlink RS transmissions, allocating at least the first set of resources comprises allocating at least a portion of the first set of resources to at least a half-symbol located in a guard period of the subframe, and
      for uplink RS transmissions, allocating at least the first set of resources comprises allocating at least a portion of the first set of resources to at least a half-symbol located in a common burst region of the subframe;
   allocating a second set of resources to fewer RS symbols than the first set of resources in the subframe for a second UE, wherein a location of the at least two RS symbols in the subframe and a location of the fewer RS symbols in the subframe is symmetric between downlink RS transmissions and RS uplink transmissions;
   communicating with the first UE based on RSs transmitted using the first set of resources; and
   communicating with the second UE based on RSs transmitted using the second set of resources.

2. The method of claim 1, wherein:
   allocating the first set of resources to the at least two RS symbols in the subframe for the first UE is based on a first Doppler measurement of a first UE being at or above a threshold value; and
   allocating the second set of resources to the fewer RS symbols than the first set of resources in the subframe for the second UE is based on a second Doppler measurement of the second UE being less than the threshold value.

3. The method of claim 2, wherein, based on the first Doppler measurement of the first UE being at or above a threshold value the first set of resources are allocated to one or more symbol durations of multiple clusters of tones.

4. The method of claim 1, wherein:
   the first and second sets of resources overlap in time; and
   at least one of code division multiplexing (CDM) or frequency division multiplexing (FDM) is used to transmit RSs in the first and second sets of resources that overlap in time.

5. The method of claim 1, wherein resources of the first set of resources are mapped to tones across multiple symbols according to a mapping algorithm that is at least one of random or pseudo-random.

6. The method of claim 1, wherein a first number of the at least two RS symbols in the subframe and a second number of the fewer RS symbols in the subframe are symmetric between downlink RS transmissions and RS uplink transmissions.

7. The method of claim 1, wherein the RSs transmitted using the first set of resources and the RSs transmitted using the second set of resources comprise demodulation reference signals (DMRSs).

8. The method of claim 1, wherein:
   allocating the first set of resources to the at least two RS symbols in the subframe comprises allocating the first set of resources to the at least two RS symbols in a first slot of the subframe; and
   allocating the second set of resources to the fewer RS symbols in the subframe comprises allocating the second set of resources to the fewer RS symbols in a second slot of the subframe.

9. The method of claim 1, wherein:
   the first set of resources are allocated to the at least two RS symbols in a first slot of the subframe; and
   the second set of resources are allocated to the fewer RS symbols in a second slot of the subframe.

10. A method of wireless communication by a first user equipment (UE), comprising:
    determining at least a first set of resources allocated to at least two reference signal (RS) symbols in a subframe for the first UE, wherein:
       for downlink RS transmissions, at least a portion of the first set of resources are allocated to at least a half-symbol located in a guard period of the subframe,
       for uplink RS transmissions, at least a portion of the first set of resources are allocated to at least a half-symbol located in a common burst region of the subframe,
       a second set of resources are allocated to fewer RS symbols than the first set of resources in the subframe for a second UE, and
       a location of the at least two RS symbols in the subframe and a location of the fewer RS symbols in the subframe is symmetric between downlink RS transmissions and RS uplink transmissions; and
    communicating with a base station based on RSs transmitted using the first set of resources.

11. The method of claim 10, wherein:
    the first set of resources are allocated to the at least two RS symbols in the subframe for the first UE based on a first Doppler measurement of a first UE being at or above a threshold value; and
    the second set of resources are allocated to the fewer RS symbols than the first set of resources in the subframe for the second UE based on a second Doppler measurement of the second UE being less than the threshold value.

12. The method of claim 11, wherein, based on the first Doppler measurement of the first UE being at or above a threshold value the first set of resources are allocated to one or more symbol durations of multiple clusters of tones.

13. The method of claim 10, wherein:
the first and second sets of resources overlap in time; and
at least one of code division multiplexing (CDM) or frequency division multiplexing (FDM) is used to transmit RSs in the first and second sets of resources that overlap in time.

14. The method of claim 10, wherein resources of the first set of resources are mapped to tones across multiple symbols according to a mapping algorithm that is at least one of random or pseudo-random.

15. The method of claim 10, wherein a first number of the at least two RS symbols in the subframe and a second number of the fewer RS symbols in the subframe are symmetric between downlink RS transmissions and RS uplink transmissions.

16. The method of claim 10, wherein the RSs transmitted using the first set of resources and the RSs transmitted using the second set of resources comprise demodulation reference signals (DMRSs).

17. An apparatus for wireless communication by a base station, comprising:
at least one processor configured to:
allocate a first set of resources to at least two reference signal (RS) symbols in a subframe for a first UE, wherein:
for downlink RS transmissions, the at least one processor is configured to allocate at least a portion of the first set of resources to at least a half-symbol located in a guard period of the subframe, and
for uplink RS transmissions, the at least one processor is configured to allocate at least a portion of the first set of resources to at least a half-symbol located in a common burst region of the subframe;
allocate a second set of resources to fewer RS symbols than the first set of resources in the subframe for a second UE, wherein a location of the at least two RS symbols in the subframe and a location of the fewer RS symbols in the subframe is symmetric between downlink RS transmissions and RS uplink transmissions;
communicate with the first UE based on RSs transmitted using the first set of resources; and
communicate with the second UE based on RSs transmitted using the second set of resources; and
a memory coupled with the at least one processor.

18. The apparatus of claim 17, wherein:
at least one processor configured to allocate the first set of resources to the at least two RS symbols in the subframe for the first UE based on a first Doppler measurement of a first UE being at or above a threshold value; and
at least one processor configured to allocate the second set of resources to the fewer RS symbols than the first set of resources in the subframe for the second UE based on a second Doppler measurement of the second UE being less than the threshold value.

19. The apparatus of claim 18, wherein, based on the first Doppler measurement of the first UE being at or above a threshold value, the at least one processor configured to allocated the first set of resources to one or more symbol durations of multiple clusters of tones.

20. The apparatus of claim 17, wherein:
the first and second sets of resources overlap in time; and
at least one of code division multiplexing (CDM) or frequency division multiplexing (FDM) is used to transmit RSs in the first and second sets of resources that overlap in time.

21. The apparatus of claim 17, wherein a first number of the at least two RS symbols in the subframe and a second number of the fewer RS symbols in the subframe are symmetric between downlink RS transmissions and RS uplink transmissions.

22. An apparatus for wireless communication by a first user equipment (UE), comprising:
at least one processor configured to:
determine at least a first set of resources allocated to at least two reference signal (RS) symbols in a subframe for the first UE, wherein:
for downlink RS transmissions, at least a portion of the first set of resources are allocated to at least a half-symbol located in a guard period of the subframe,
for uplink RS transmissions, at least a portion of the first set of resources are allocated to at least a half-symbol located in a common burst region of the subframe,
a second set of resources are allocated to fewer RS symbols than the first set of resources in the subframe for a second UE, and
a location of the at least two RS symbols in the subframe and a location of the fewer RS symbols in the subframe is symmetric between downlink RS transmissions and RS uplink transmissions; and
communicate with a base station based on RSs transmitted using the first set of resources; and
a memory coupled with the at least one processor.

23. The apparatus of claim 22, wherein:
the first set of resources are allocated to the at least two RS symbols in the subframe for the first UE based on a first Doppler measurement of a first UE being at or above a threshold value; and
the second set of resources are allocated to the fewer RS symbols than the first set of resources in the subframe for the second UE based on a second Doppler measurement of the second UE being less than the threshold value.

24. The apparatus of claim 23, wherein, based on the first Doppler measurement of the first UE being at or above a threshold value the first set of resources are allocated to one or more symbol durations of multiple clusters of tones.

25. The apparatus of claim 22, wherein:
the first and second sets of resources overlap in time; and
at least one of code division multiplexing (CDM) or frequency division multiplexing (FDM) is used to transmit RSs in the first and second sets of resources that overlap in time.

26. The apparatus of claim 22, wherein a first number of the at least two RS symbols in the subframe and a second number of the fewer RS symbols in the subframe are symmetric between downlink RS transmissions and RS uplink transmissions.

* * * * *